Figure 1:
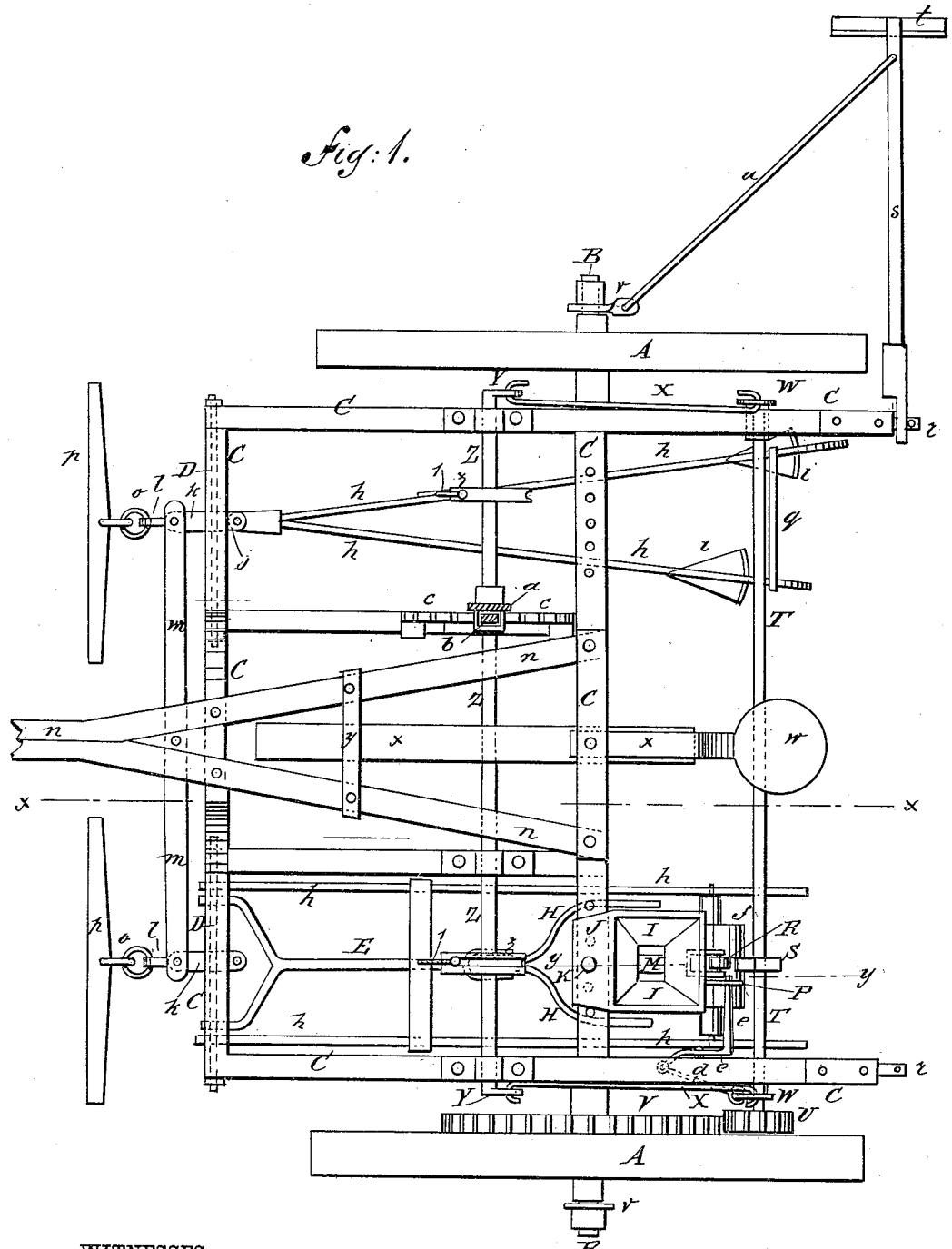

(No Model.) 2 Sheets—Sheet 1.

J. C. WEISS.
COMBINED CORN PLANTER AND CULTIVATOR.

No. 353,835. Patented Dec. 7, 1886.

WITNESSES:
INVENTOR:
J. C. Weiss
BY Munn & Co.
ATTORNEYS.

(No Model.) 2 Sheets—Sheet 2.
J. C. WEISS.
COMBINED CORN PLANTER AND CULTIVATOR.
No. 353,835. Patented Dec. 7, 1886.
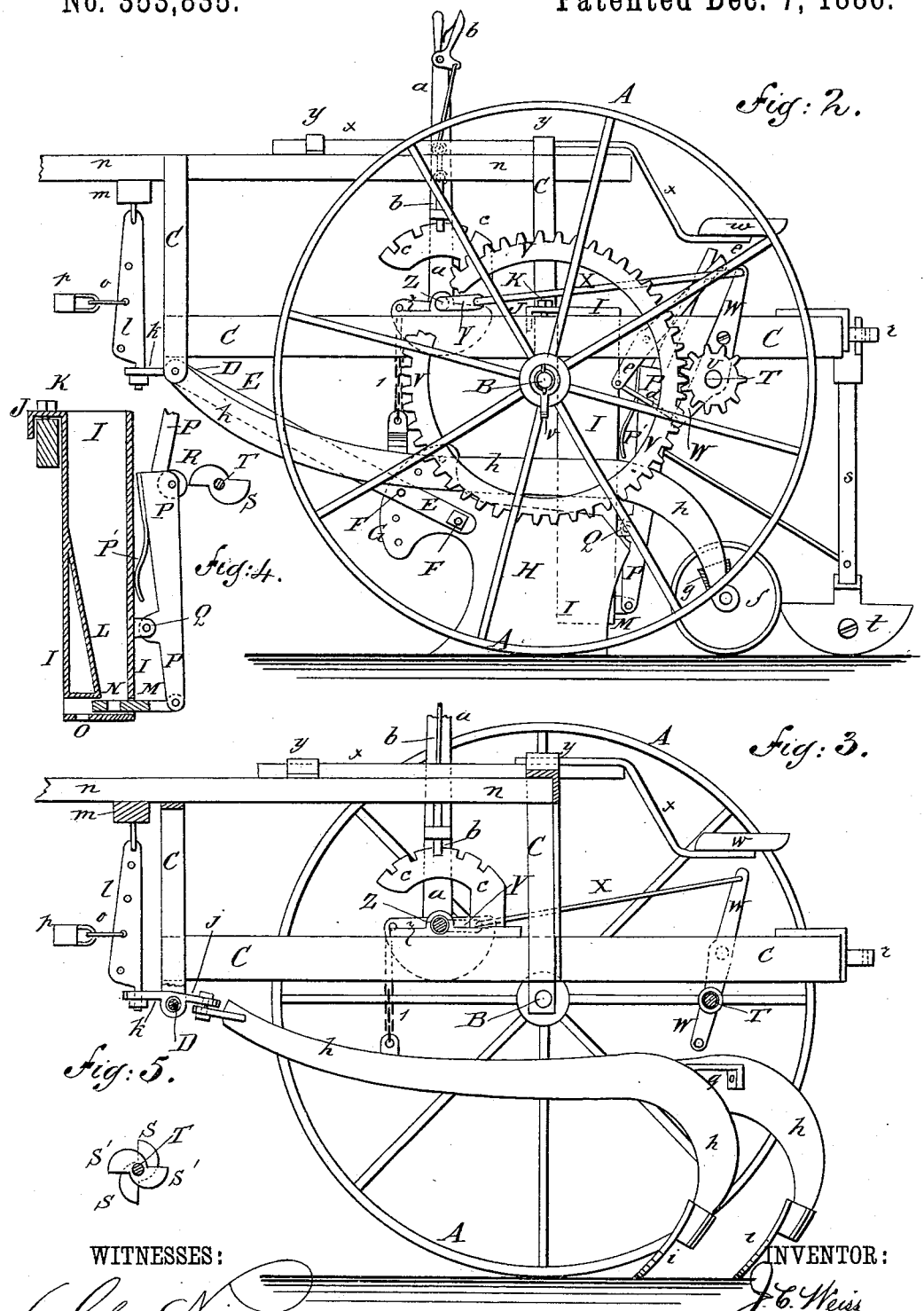
WITNESSES:
Chas Nida
C. Sedgwick
INVENTOR:
J. C. Weiss
BY
Munn & Co
ATTORNEYS.

UNITED STATES PATENT OFFICE.

JOHN C. WEISS, OF SHELDON, MISSOURI.

COMBINED CORN-PLANTER AND CULTIVATOR.

SPECIFICATION forming part of Letters Patent No. 353,835, dated December 7, 1886.

Application filed February 15, 1886. Serial No. 191,949. (No model.)

*To all whom it may concern:*

Be it known that I, JOHN C. WEISS, of Sheldon, in the county of Vernon and State of Missouri, have invented a new and useful Improvement in a Combined Corn-Planter and Cultivator, of which the following is a full, clear, and exact description.

Reference is to be had to the accompanying drawings, forming a part of this specification, in which similar letters of reference indicate corresponding parts in all the figures.

Figure 1 is a plan view of my improved corn-planter and cultivator, part being shown arranged as a corn-planter and the other part as a cultivator. Fig. 2 is a side elevation of the same, shown arranged as a corn-planter. Fig. 3 is a sectional elevation of the same, taken through the broken line $xx$, Fig. 1, and shown arranged as a cultivator. Fig. 4 is a sectional side elevation of a seed-box, taken through the line $yy$, Fig. 1, and showing the seed-dropping mechanism. Fig. 5 is a side elevation of a four-armed cam, the cam-shaft being shown in section.

The object of this invention is to improve the construction of the combined corn-planters and cultivators for which Letters Patent No. 270,524 were issued January 9, 1883, in such a manner as to make them more convenient in use and more reliable in operation.

The invention consists in the construction and combination of various parts of the combined corn-planter and cultivator, as will be hereinafter fully described.

A represents the wheels, which revolve upon the journals of short axles B, secured to the frame C. The middle parts of the cross-bars of the frame C are arched, to adapt the said frame to pass over tall plants when the machine is used as a cultivator.

To the forward end of the frame C, or to hangers attached to the said end, are secured short shafts D, to which are hinged the forked forward ends of the draw-bars E. The rear ends of the draw-bars E are forked, and are secured by two bolts, F, to lugs G, formed upon the upper forward parts of the furrow-opening plows H. The forward parts of the lugs G are widened and have a number of bolt-holes formed through them in the arc of a circle having its center in the center of the rear bolt-hole, so that by adjusting the forward bolt, F, from one to another of the said holes the pitch of the opening-plows H can be regulated to cause the said plows to enter the soil to any desired depth. The plows H are forked to receive the lower ends of the seed-boxes I, so that the seed will be deposited in the bottoms of the furrows before the said furrows can be partially filled by the falling in of the soil. The seed-boxes I are made with wide hooks J, upon the upper edges of their forward sides, to hook upon the rear cross-bar of the frame C. The seed-boxes I are secured in position by pins K, which pass through holes in the suspension-hooks J and enter holes in the rear cross-bar of the frame C.

Several holes are formed in the rear cross-bar of the frame C, to receive the pins K, so that the seed-boxes I can be adjusted wider apart or closer together, according as the rows of hills are required to be at a greater or less distance apart. In the forward lower parts of the seed-boxes I are secured triangular blocks or plates L, the square lower ends of which are at such a distance above the bottoms of the said boxes as to serve as cut-offs to the seed-dropping slides M, which slide upon the said bottoms, and have holes N formed in them to receive seed from the seed-boxes I and convey it to the discharge-holes O, formed in the seed-box bottoms beneath the cut-off blocks L, and through which the said seed drops to the ground.

The rear ends of the seed-dropping slides M are hinged to the lower ends of the levers P, which are placed at the rear sides of the seed-boxes I, and are pivoted at a little distance from their lower ends to lugs or brackets Q, attached to the rear sides of the said seed-boxes. To the upper parts of the levers P, or to brackets attached thereto, are pivoted small friction-wheels R, against which rest the S-shaped cams S, attached to the shaft T. The cams S are usually made with two arms, as shown in Fig. 4; but when the seed is to be dropped at a less distance apart a second two-armed cam, S', is placed upon the shaft T, and secured to the first cam with its arms at right angles to the arms of the said first cam, as shown in Fig. 5, so that the levers P will be operated four times at each revolution of the shaft T.

To one end of the shaft T is attached a small gear-wheel, U, the teeth of which mesh into the teeth of the large gear-wheel V, attached to one of the wheels A, so that the cam-shaft will be revolved to operate the seed-dropping lever and slide by the advance of the machine. The levers P are brought back into position, after being operated by the cams S, by springs P', attached to the upper parts of the said levers, and resting against the rear sides of the seed-boxes I. The shaft T is journaled to the lower arms of lever-hangers W, which are pivoted at their middle parts to the rear parts of the side bars of the frame C. To the upper ends of the lever-hangers W are pivoted the rear ends of connecting-rods X, the forward ends of which are pivoted to the outer ends of crank-arms Y, formed upon or attached to the ends of the shaft Z. The shaft Z rocks in bearings attached to the longitudinal bars of the frame C, and to its middle part is rigidly attached the lower end of a lever, $a$, which projects into such a position that it can be readily reached and operated by the driver from his seat to swing the lever-hangers W, and thus throw the gear-wheel U into and out of gear with the gear-wheel V. The lever $a$ is provided with a spring-lever pawl, $b$, which engages with the recessed arched bar $c$, attached to the frame C, to hold the said lever $a$ securely in any position into which it may be adjusted.

To the lower ends of the lever-hangers W are pivoted the rear ends of short connecting-bars $d$, the forward ends of which are pivoted to the lower ends of the levers $e$. The levers $e$ are pivoted to the side bars of the frame C, and the upper parts of their upper arms are bent inward at right angles so as to be in the rear of the upper ends of the levers P, so that when the lever $a$ is operated to throw the gear-wheel U out of gear with the gear-wheel V, the said lever P and the seed-dropping slide M will be locked in place to prevent the accidental waste of seed.

To the crank-shaft Z are secured segments of pulleys $z$, to which are attached the upper ends of chains 1, the lower ends of which are attached to the draw-bar E and the beams $h$, so that the opening-plows and the covering-rollers will be raised from the ground by the same movement that throws the seed-dropping mechanism out of gear. The soil is pressed down upon the seed, and the top of the row is smoothed by short rollers $f$, journaled to bearings $g$, detachably secured to the rear ends of the beams $h$, so that the said rollers and bearings can be readily detached and replaced by plows $i$ when the machine is to be used as a cultivator. The forward ends of the beams $h$ are hinged to the shafts D, so that the rollers $f$ can have a free vertical movement to allow them to adjust themselves to the surface of uneven ground. One of the beams $h$ is made a little longer than the other, so that when the machine is adjusted as a cultivator one of the plows of each pair of beams will be a little in advance of the other.

When the machine is adjusted as a cultivator, the forward ends of the beams of each pair are brought together, and are secured to a coupling, $j$, by a vertical bolt or other suitable means, so that the rear ends of the said beams will have a free lateral movement. The coupling $j$ is hinged to the shaft D, so that the rear ends of the plow-beams will have a free vertical movement. The rear parts of the beams $h$ of each pair, when the machine is arranged as a cultivator, are connected by a cross-bar, $q$, so that the said beams will move together. With this construction the plowman can guide the plows with his feet, when desired.

With the shafts D are connected, by couplings $k$, the lower ends of the upright draft-bars $l$, the upper ends of which are hinged to the end parts of the double-tree $m$. The double-tree $m$ is pivoted at its center to the tongue $n$, attached to the arched parts of the cross-bars of the frame C. With the draft-bars $l$ are connected, by clevises or other suitable couplings, $o$, whiffletrees $p$. Several holes are formed in the draft-bars $l$ to receive the couplings $o$, so that the points of draft attachment can be adjusted at any desired height.

To the rear ends of the side bars of the frame C are attached or upon them are formed gudgeons $r$, to receive the perforated end of the bar $s$, to the outer end of which is attached a semicircular marking-shoe, $t$. The draft strain upon the bar $s$ is sustained by a brace-rod, $u$, the inner end of which is hooked into a coupling, $v$, pivoted to the outer end of the axle B, so that the marker can be readily changed from one side of the machine to the other as the said machine is turned at the sides of the field. $w$ is the driver's seat, which is attached to the rear end of the bar $x$, which slides in keepers $y$, attached to the tongue $n$, so that the said driver's seat can be readily moved forward and back, as may be required, to cause the driver's weight to properly balance the machine. The rear part of the bar $x$ is bent downward and then rearward, to bring the seat $w$ to the proper height.

Having thus fully described my invention, I claim as new and desire to secure by Letters Patent—

1. The combination, with the frame C, the drive-wheels A, and the hopper I, of the lever P, pivoted to the hopper, the apertured seed-slide M, pivoted to the lower end of the said lever, and working in the bottom of the hopper, the spring P', between the lever P and the hopper, the shaft T, the S-shaped double cam S on the said shaft, and means for operating the said shaft from one of the drive-wheels, substantially as herein shown and described.

2. In a combined corn-planter and cultivator, the combination, with the crank-shaft Z, having operating-lever $a$, the connecting-rods X, the cam-shaft T, and the pivoted lever-hangers W, of the connecting-rod $d$ and the lever $e$, having inwardly-projecting arm, substantially as herein shown and described, whereby the seed-dropping levers and slides will be locked in position when the opening-plows and covering-rollers are raised from the ground, as set forth.

JOHN C. WEISS.

Witnesses:
C. P. BARNES,
JAMES W. DOYLE.